Patented Sept. 8, 1953

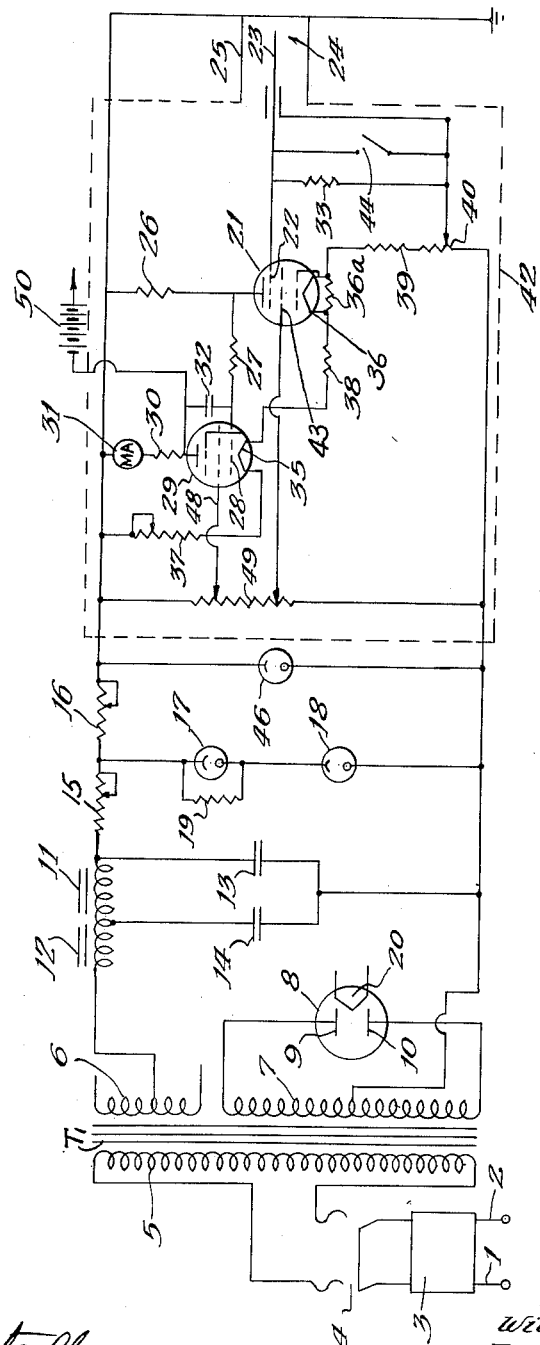

2,651,726

UNITED STATES PATENT OFFICE 2,651,726

IONIZATION CHAMBER CIRCUIT

Darol K. Froman, Santa Fe, N. Mex., William H. Hinch, Denver, Colo., and Richard J. Watts, Santa Fe, N. Mex., assignors to the United States of America as represented by the United States Atomic Energy Commission Application February 11, 1946, Serial No. 646,947

1 Claim. (Cl. 250—83.6)

This invention relates to an improved direct-coupled amplifier for measuring minute currents, and more particularly to a D. C. direct-coupled amplifier for use with an ionization chamber.

In the past, various amplifier systems have been developed for the purpose of detecting and measuring very small currents. In most of these systems, however, difficulties have arisen due to changing characteristics in the electron tube such as the presence of appreciable grid currents and the variations of these currents as a result of varying grid voltages.

An object of this invention, therefore, is to provide a novel direct-coupled D. C. amplifier which is suitable for measuring very small currents such as those developed in an ionization chamber.

A more specific object of this invention is to provide a novel, direct-coupled amplifier for measuring currents developed in an ionization chamber and employing a circuit having for the electrometer tube a pentode type acorn tube.

A further object of this invention is to provide a novel method of operating a conventional type of acorn tube so as to obtain greater stability and more faithful detection of very small currents so that currents of the order of $10^{-13}$ amperes may be accurately measured.

A more specific object of this invention is to provide a novel D. C. direct-coupled amplifier employing an electrometer tube whose various elements, such as the filament and electrodes, are energized by a regulated D. C. voltage source so as to obtain stable operation.

Other objects and advantages will become apparent from a study of the following specification describing a preferred embodiment of the present invention taken with the accompanying drawing in which:

The single figure is a schematic wiring diagram of a D. C. direct-coupled amplifier circuit embodying the principles of the present invention.

Referring more particularly to the drawing, a conventional power supply is illustrated at the left hand portion of the circuit which power supply, per se, forms no part of the present invention and comprises a pair of line conductors 1 and 2 energized by a suitable source of A. C. potential such as the common household 115-volt, 60-cycle source, and which are connected to the input terminals of a constant voltage transformer (C. V. T.) illustrated by block diagram 3. A double-pole, single-throw switch 4 is connected across the output terminals of transformer 3 and across the input terminals of primary winding 5 of the power transformer T1. The power transformer T1 has a pair of secondary windings 6 and 7. Winding 6 energizes the filament 20 of a full wave rectifier tube 8, such as, for example, a type 5V4G. The secondary winding 7 and rectifier tube 8 are designed to provide a suitable D. C. voltage to the amplifier circuit to be described more fully hereinafter. The terminals of winding 7 are connected to anodes 9 and 10 of tube 8. The center tap of winding 6 is connected to the B+ terminal whereas the center tap of winding 7 is connected to the B— or grounded terminal of the amplifier.

A filter circuit comprising inductance coils 11 and 12 of 15 henries and 10 henries, respectively, for example, and condensers 13 and 14 of 8 microfarads each, for example, are provided for smoothing out the pulsating D. C. voltage output of the tube 8 applied to the B+ and B— terminals in a manner well known in the art. Variable resistors 15 and 16 of any suitable value, such as 2000 ohms each, are provided in series with the B+ terminal for varying the voltage applied to voltage regulating tubes 17 and 18 connected in series across the B+ and B— terminals. These tubes may be of any suitable type such as, for example, type VR–105. Tube 17 is bridged by a resistor 19 which may be of the order of 100 megohms to facilitate starting or discharge of the voltage regulating tubes. Also connected across the B+ and B— terminals in cascade with tubes 17 and 18 to obtain even more constant D. C. voltage is a voltage regulating tube 46 which may be a type VR–150. Voltage regulating tubes 17, 18 and 46 are essentially glow discharge tubes and, as such, have the inherent characteristic of maintaining substantially constant voltage drop thereacross for wide variations in current flow. Hence, if the B+ voltage should suddenly increase due to increase of line voltage, notwithstanding the presence of constant voltage transformer 3, the voltage applied across the B+ and B— terminals would remain substantially constant despite an increase in current flow through the filament 20, for example. By the above described circuit, therefore, a substantially constant D. C. potential is applied to the B+ and B— terminals.

An important feature of the present invention is the choice of, as well as the connection or mode of operation of, the electrometer tube. A conventional pentode type acorn tube, such as, for example, a type 959, is preferred for the electrometer tube because of the very small size thereof, said tube being only ⅝ inch in diameter and about 1½ inches in height, therefore, easy to evacuate to very high vacuum due to the small, readily degassable parts. Furthermore, since such small tubes are made entirely of glass instead of part glass and part Bakelite, higher resistance surfaces are provided. An important feature is the discovery that the suppressor or No. 3 grid of this type of tube, that is, the one closest the anode, has the lowest grid current, about $10^{-13}$ amperes, and the grid current is practically constant for varying grid voltages. For this reason, this tube has been connected in an unorthodox manner, that is, instead of choosing the No. 1 grid which is the one next to the cathode, as the control grid, in accordance with conventional practice, the No. 3 grid, namely, the suppressor grid, which is the one closest the anode, is chosen as the control grid for use in the electrometer circuit for connection to the collecting electrode of the ionization chamber. In addition to this unorthodox procedure it is found highly desirable to reduce all the voltages of the electrodes far below their rated values. This is done in order to prevent any residual gases from ionizing and giving rise to undesirable grid currents, as well as to prevent high voltage gradients between electrodes which, in turn, would increase the possibility of leakage currents. The following are examples of typical voltages that give satisfactory operation although it will be understood that these values may be varied within limits:

$E_p = 8$ v.
$E_f = 1.1$ v.
$E_{g1} = 0$
$E_{g2} = 12$ v.
$E_{g3} = -6$ v.

Where $E_p$ equals plate voltage: $E_f$ equals filament voltage: $E_{g1}$ equals voltage of grid No. 1, etc. All voltages are given with respect to the negative side of the filament.

In order that the electrometer tube may be connected with a high resistance in the input circuit the conventional socket clip is not used but the tube is dipped in ceresin wax to eliminate leakage over the surface, and a fine wire is soldered directly to the suppressor grid tube lead. The high resistance element or elements are soldered directly to the suppressor grid lead of the tube and the whole assembly is dipped in ceresin wax.

The above described electrometer tube is illustrated by numeral 21 in the circuit diagram. The suppressor grid 22 thereof, which, as described above, serves as the input grid, is connected to the collecting electrode 23 of the ionization chamber 24 having, for example, a boron trifluoride atmosphere contained in a vessel or chamber 25. Chamber 25 is maintained at ground potential for easy handling and the voltage on the collecting electrode 23 is negative with respect to the chamber. Thus, when an ionization current is produced in the chamber due to falling thereon of radiations, such as gamma rays from a radioactive source whose intensity is to be measured, the suppressor grid 22 of the 959 acorn type tube 21 becomes less negative, and there is an increase in voltage drop in plate resistor 26 caused by increased plate current flow through tube 21. Tube 21 is used as a power or current amplifier since its voltage gain is approximately unity. The output of the electrometer tube 21 is fed through coupling resistor 27 to a control grid 28 of amplifying tube 29 which tube may be, for example, a type 1N5–GT pentode. The negative signal pulse on grid 28 causes a decrease in plate current flow in tube 29 hence a decrease in plate current flow through plate resistor 30 which is indicated by milliammeter 31. Since an increase in radiation as detected by ionization chamber 24 is shown as a decrease in plate current of tube 29 the position of zero intensity is at the normal full scale position of meter 31.

As an additional function of the circuit, the voltage output of tube 29 may be coupled through a battery 50 to the input stage of another amplifier circuit or thyratron circuit (not shown) that controls some operation, for example that of changing the intensity of a radioactive source such as a neutronic reactor whose radiations fall upon ionization chamber 24. For example, a thyratron circuit may operate a relay (not shown) that will move a rod of neutron absorbing material, such as cadmium, either into or out of the neutronic reactor in response to a current increase or decrease, respectively, in ionization chamber 24 so as to control the neutronic reaction and maintain the radiation intensity at a substantially constant value.

The capacitor and resistor in the grid and plate circuits of the amplifier tube 29 are provided to reduce the fluctuations caused by variations in voltage supply. More specifically, the R. C. circuit comprises resistor 27 in series with the parallel circuit including resistor 26 and the plate resistance of tube 21, also in series with capacitor 32 considered with respect to the gain of tube 29. The introduction of this filter increases the time constant of the circuit.

The grid voltage sensitivity of the electrometer tube 21 is approximately 2.5 volts for full scale deflection. Thus, with a $10^{11}$ ohm resistor 33, for example, as the grid leak, ionization currents of the order of 2.5 times $10^{-11}$ amperes can be accurately measured giving full scale reading.

To achieve greater stability of the direct-coupled amplifier the filaments 35 and 36 of tubes 29 and 21, respectively, are connected in series across the regulated voltage output of the power supply, and suitable resistors 37, 38, 39 and 40 are in series with the filaments so as to reduce current flow to below rated values resulting in increased tube life. Resistors 37 and 40 are made variable. Resistor 40 serves as a zero-set for meter 31. Filament 36 of tube 21 is bridged by a resistor 36a to further reduce current flow and maintain the filament temperature at a relatively low value to obtain better operation. The power consumed in this filament may be of the order of 70 milli-watts. The voltage supply for screen grid 48 of tube 29 and for screen grid 43 of tube 21 is taken from a potentiometer resistor 49 connected across the regulated D. C. source, that is, across the B+ and B− terminals, which is the same source that supplies the filament voltages, thereby providing stable operation of the tubes since the acceleration of electrons emitted by constant potential electrodes stabilizes the potential between the grids and cathode.

While the values of the various resistors and capacitors described above may be varied within wide limits and still give satisfactory operation, a group of values are indicated herewith that will give satisfactory operation:

Resistor 26=1.5 megohms
    Resistor 27=1 megohm
    Resistor 30=100,000 ohms
    Resistor 36=150 ohms
    Resistor 37=5000 ohms
    Resistor 38=150 ohms
    Resistor 39=150 ohms
    Resistor 40=50 ohms
    Resistor 49=50,000 ohms
    Capacitor 32=.015 mf.

An electrostatic shield 42, schematically indicated in dotted lines, encloses the two tubes and the associated circuits included within the boundaries indicated so as to prevent introduction of induced extraneous voltages and the like that would otherwise introduce errors in measurement.

While only a single high value resistor 33 is shown, it will be apparent that a bank of such resistors may be used instead with suitable switches so that one may be substituted for the other. In the case that it is desired to have zero resistance, a suitable shunting switch 44 is provided and may be used for calibration. Furthermore, instead of using the 959 type tube, other miniature tubes having five or more electrodes may be utilized.

Thus, it will be seen that we have provided an efficient, direct-coupled amplifier that is highly useful for measuring small currents such as those developed in an ionization chamber or similar device and which embodies a miniature or acorn type of electrometer tube whose electrodes are connected in an unusual way, that is, whose suppressor grid is connected as the control grid so as to obtain more stable tube characteristics and greater accuracy in measurement of small currents. Also we have provided a constant voltage, direct current source for feeding the filaments of the electrometer and amplifier tubes as well as for energizing the respective electrodes thereof, thereby obtaining greater stability of operation of the amplifier so as to make the amplifier effective for reading accurately currents of the order of $10^{-13}$ amperes.

Modifications of the above invention will be readily suggested to those skilled in the art after having had the benefit of the teachings of the present specification for which reason the invention should be restricted only insofar as set forth in the following claim.

What is claimed is:

Radiation-measuring apparatus comprising, in combination, a single source of regulated direct voltage having positive and negative terminals, input and output pentode vacuum tubes having filamentary cathodes, plate load resistors connecting the plates of said vacuum tubes, respectively, to the positive terminal of the voltage source, a direct current meter in series with the plate load resistor of the output tube, a series circuit between the positive and negative terminals of the voltage supply comprising the filaments of the tubes and a variably tapped resistance connecting the filament of the input tube to the negative terminal of the voltage supply, an ionization chamber connected between the suppressor grid of the input tube and the positive terminal of the voltage supply, a high-value resistance connected between the tap on the first-mentioned resistance and the suppressor grid of the input tube, a manually operable shorting switch connected in parallel with the high-value resistance, a direct-voltage coupling from the plate of the input tube to the first grid of the output tube, and means for applying operating potentials to the screen grids of said tubes from said voltage supply.

DAROL K. FROMAN.
WILLIAM H. HINCH.
RICHARD J. WATTS.

References Cited in the file of this patent

UNITED STATES PATENTS

| Number | Name | Date |
|---|---|---|
| 2,088,584 | Bucky | Aug. 3, 1937 |
| 2,149,361 | Rath | Mar. 7, 1939 |
| 2,262,916 | Boucke | Nov. 18, 1941 |
| 2,307,027 | Davie | Jan. 5, 1943 |
| 2,311,807 | Anderson | Feb. 23, 1943 |
| 2,315,658 | Roberts | Apr. 6, 1943 |
| 2,354,718 | Tuttle | Aug. 1, 1944 |
| 2,381,904 | Hare | Aug. 14, 1945 |
| 2,383,478 | Friedman | Aug. 28, 1945 |
| 2,392,415 | Soller | Jan. 8, 1946 |
| 2,399,441 | Krebs | Apr. 30, 1946 |
| 2,453,318 | Hartline | Nov. 9, 1948 |

OTHER REFERENCES

Applied Nuclear Physics, by Pollard and Davidson, August, 1945, pp. 41–43.